(12) United States Patent
Nesbitt

(10) Patent No.: US 9,096,201 B2
(45) Date of Patent: Aug. 4, 2015

(54) YAW RATE FORECASTING

(75) Inventor: Richard T. Nesbitt, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 1125 days.

(21) Appl. No.: 13/051,147

(22) Filed: Mar. 18, 2011

(65) Prior Publication Data

US 2012/0239241 A1   Sep. 20, 2012

(51) Int. Cl.
*G06F 7/00* (2006.01)
*B60T 7/12* (2006.01)
*B60T 8/1755* (2006.01)
*B60T 17/22* (2006.01)

(52) U.S. Cl.
CPC .............. *B60T 8/17551* (2013.01); *B60T 17/22* (2013.01); *B60T 2250/03* (2013.01); *B60T 2270/86* (2013.01)

(58) Field of Classification Search
CPC .................... B60G 2400/0523; B60W 40/114; B60W 2520/14; B60W 2720/14; B62D 6/005; B62D 7/159
USPC ........................................ 701/29, 29.2, 30.2
See application file for complete search history.

(56) References Cited

U.S. PATENT DOCUMENTS

| | | | |
|---|---|---|---|
| 6,219,609 B1 | 4/2001 | Matsuno et al. | |
| 6,547,343 B1 | 4/2003 | Hac | |
| 6,885,931 B2 | 4/2005 | Anwar | |
| 7,158,866 B2 | 1/2007 | Gustafsson et al. | |
| 7,191,047 B2 | 3/2007 | Chen | |
| 8,041,480 B2 | 10/2011 | Iwazaki | |
| 2004/0225427 A1* | 11/2004 | Anwar | 701/38 |
| 2010/0023224 A1 | 1/2010 | Stabrey | |

FOREIGN PATENT DOCUMENTS

| | | |
|---|---|---|
| DE | 10311794 | 5/2004 |
| DE | 102007002500 | 7/2008 |
| JP | 2007276564 | 10/2007 |

OTHER PUBLICATIONS

International Search Report and Written Opinion for Application No. PCT/US2012/028182 dated Jun. 1, 2012 (9 pages).
Anwar, Sohel, "Yaw stability control of an automotive vehicle via generalized predictive algorithm," manuscript, Proceedings of the American Control Conference, Jun. 8-10, 2005, pp. 435-440, v. 1, Institute of Electrical and Electronics Engineers Inc.

(Continued)

*Primary Examiner* — John Q Nguyen
*Assistant Examiner* — Kyung Kim
(74) *Attorney, Agent, or Firm* — Michael Best & Friedrich LLP

(57) ABSTRACT

A yaw-rate forecasting system for a vehicle. The system includes a yaw rate sensor and an electronic control unit. The yaw rate sensor is configured to detect a yaw rate of the vehicle and to generate a signal indicative of the detected yaw rate. The electronic control unit is coupled to the yaw rate sensor, and is configured to receive the signal indicative of the yaw rate of the vehicle from the yaw rate sensor, forecast a future yaw rate, determine a stability of the vehicle using the forecasted yaw rate, and to generate a signal to control actuation of a vehicle brake.

17 Claims, 4 Drawing Sheets

(56) References Cited

OTHER PUBLICATIONS

Anwar, Sohel, "Predictive yaw stability control of a brake-by-wire equipped vehicle via eddy current braking", abstract, Proceedings of the American Control Conference, Jul. 9-13, 2007, pp. 2308-2313, Institute of Electrical and Electronics Engineers Inc.

Nesbitt, Richard T., "Powersplit Hybrid Electric Vehicle Controls with Data Dependent Systems Forecasting of Accessory Loads," thesis, Dec. 14, 2001, part 1, pp. 1-59, Michigan Technological University.

Nesbitt, Richard T., "Powersplit Hybrid Electric Vehicle Controls with Data Dependent Systems Forecasting of Accessory Loads," thesis, Dec. 14, 2001, part 2, pp. 60-123, Michigan Technological University.

Pandit, S., Wu, S., "Time Series and System Analysis with Applications", book, 1993, pp. 23-75, Krieger Publishing Company, Malabar, FL.

* cited by examiner

YAW RATE FORECASTING

BACKGROUND

The invention generally relates to yaw rate forecasting. Specifically, the invention relates to use of Data Dependent Systems (DDS) Modeling, Autoregressive Moving Average models, and/or Autoregressive models, to forecast the yaw rate for use in Electronic Stability Control (ESC) systems.

ESC systems in vehicles use the yaw rate of the vehicle to make decisions regarding corrective actions. The yaw rate is provided to the ESC system by a sensor which detects the yaw rates and outputs a signal indicative of the detected yaw rate. In some systems, the yaw rate is provided to the ESC system over a bus (e.g., a CAN bus).

SUMMARY

Although current yaw rate sensors provide information to ESC systems, in most cases neither the sensors nor the ESC system forecast or predict what the yaw rate will be in the future. Forecasting yaw rate into the future can help account for communication and ESC building-pressure latencies. This can improve performance of the ESC system and reduce false interventions.

In one embodiment, the invention provides a yaw-rate forecasting system for a vehicle. The system includes a yaw rate sensor and an electronic control unit. The yaw rate sensor is configured to detect a yaw rate of the vehicle and to generate a signal indicative of the detected yaw rate. The electronic control unit is coupled to the yaw rate sensor, and is configured to receive the signal indicative of the yaw rate of the vehicle from the yaw rate sensor, forecast a future yaw rate, determine a stability of the vehicle using the forecasted yaw rate, and to generate a signal to control actuation of a vehicle brake.

In another embodiment the invention provides a method of stabilizing a vehicle based on a predicted future yaw rate of a vehicle. The method includes detecting a plurality of yaw rates of the vehicle over a period of time by a yaw rate sensor, providing an indication of the detected yaw rates to a controller, generating a model of a future yaw rate using the detected yaw rates, verifying an adequacy of the model, extending the model if the model is found to be inadequate, determining a predicted yaw rate for a moment in the future based on the model, providing the predicted yaw rate to an electronic stability control system, and determining, by the electronic stability control system, an action to take based at least in part on the predicted yaw rate.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
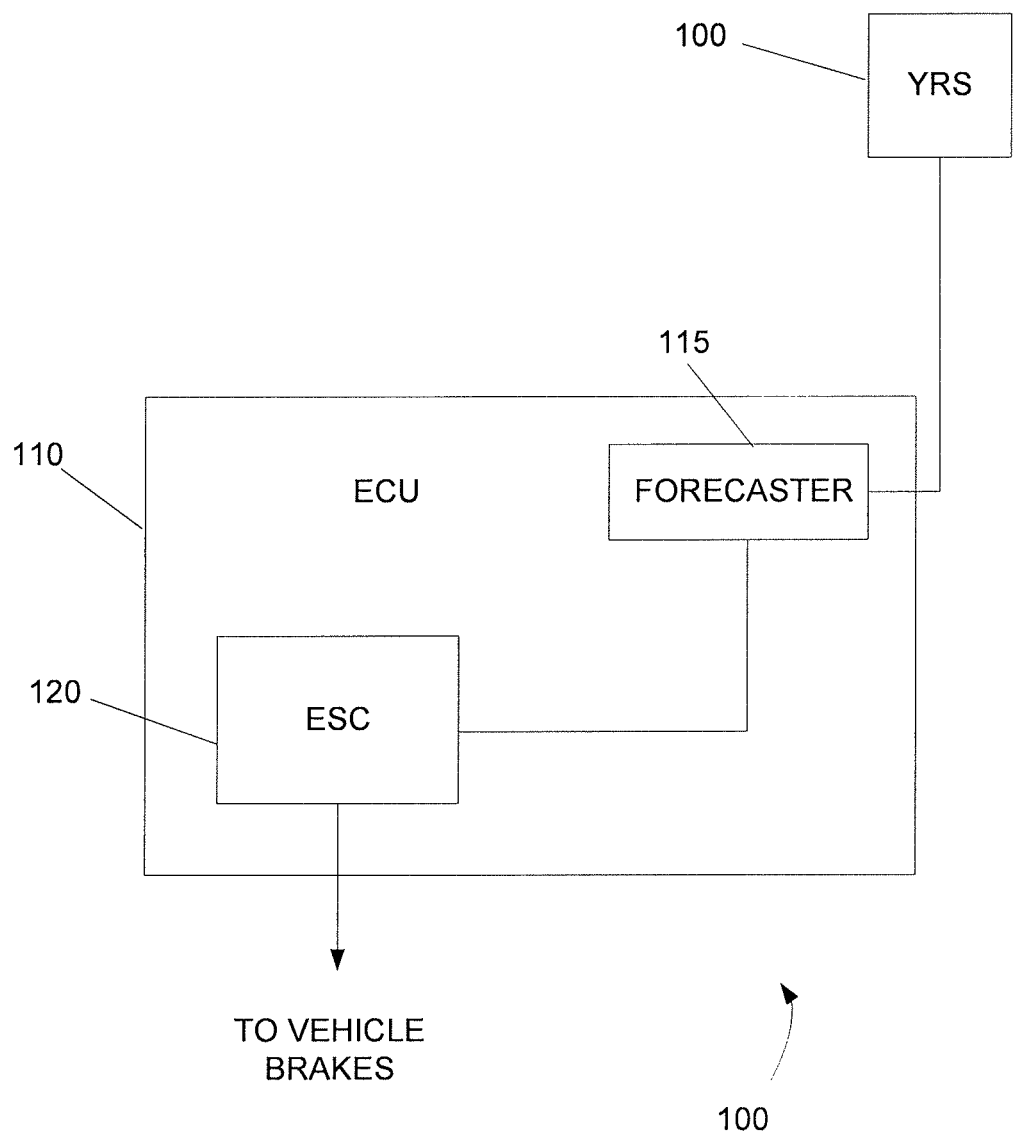
FIG. 1 is a block diagram of a system for stabilizing a vehicle using a predicted yaw rate.

FIG. 1 shows a block diagram of a system 100 for predicting (forecasting) future yaw rates and using the forecast yaw rates to stabilize a vehicle. The system 100 includes a yaw rate sensor (YRS) 105 and a controller such as an electronic control unit (ECU) 110. The ECU 110 includes a forecaster 115 and an electronic stability control (ESC) system 120. The forecaster 115, the ESC 120, or both, can be separate from or integrated into the ECU 110. The system 100, including subsystems such as the forecaster 115 and the ESC 120, can be implemented in hardware, software, or a combination of hardware and software. In some embodiments, one or more of the ECU 110, the forecaster 115, and the ESC 120 includes a processor (e.g., a microprocessor, microcontroller, ASIC, DSP, etc.) and memory (e.g., flash, ROM, RAM, EEPROM, etc.; i.e., a non-transitory computer readable medium), which can be internal to the processor, external to the processor, or both.

The forecaster 115 receives a signal from the yaw rate sensor 105. Using the signals received over a period of time, the forecaster 115 predicts or forecasts what the yaw rate will be at a point in the future. The forecaster 115 provides the predicted yaw rate to the ESC 120 which uses the predicted yaw rate to make decisions on when and how to intervene, and brake the wheels of the vehicle, to stabilize the vehicle.

The forecaster 115 uses modeling, specifically Data Dependent Systems (DDS) Modeling, Autoregressive Moving Average models, and/or Autoregressive models, to forecast the yaw rate at a point in the future.

DDS Models

DDS modeling is a statistical methodology for analyzing a time series of data. A time series is a set of data that is ordered in time. The forecaster 115 collects data (i.e., the yaw rate signal from the YRS 105) at uniform time intervals for the DDS modeling. DDS modeling relies on the fact that the order of the data is important and that current observations rely on past observations. This relationship is expressed as the autocorrelation between successive data points. The data can be broken down to the regression of two independent parts, one that depends on previous data and one that is an independent sequence. The simplest form of this regression (a first order autoregression) is $$X_t = \phi \cdot X_{t-1} + a_t \quad (1.1)$$

where, $X_t$=Data at time t, $\phi$=model (autoregressive) parameter (constant), $x_{t-1}$=Data at time t−1, and $a_t$=sequence of uncorrelated variables.

The regression of Eq. 1.1 is, more particularly, an autoregressive model (e.g., an autoregression) and shows the dependence of the current value of X on its past values. The model is a first order autoregressive model or AR(1) model. A set of data may rely on more than just the previous observation and the autoregressive model can take a general form of AR(n)

$$X_t = \phi_1 \cdot X_{t-1} + \phi_2 \cdot X_{t-2} + \ldots + \phi_n \cdot X_{t-n} + a_t \quad (1.2)$$

The autoregressive model assumes that the $a_t$'s are independent, that is $a_t$ doesn't depend on $a_{t-1}$, $a_{t-2}$, etc. If the data violates this assumption, $a_t$ can be decomposed using regression similarly to $X_t$. Take for example the AR(1) model, replacing $a_t$ with $a_t'$ $$X_t = \phi_1 \cdot X_{t-1} + a_t' \quad (1.3)$$

The $a_t'$ can be decomposed into three parts, its dependence on $X_{t-2}$, $a_{t-1}$, and an independent sequence $a_t$.

$$a_t' = \phi_2 \cdot X_{t-2} - \theta_1 \cdot a_{t-1} + a_t \qquad (1.4)$$

where,
θ=average model (moving average) parameter (constant)
Substituting back into the AR(1) model:

$$X_t = \phi_1 \cdot X_{t-1} + \phi_2 \cdot X_{t-2} + -\theta_1 \cdot a_{t-1} \qquad (1.5)$$

This is a second order autoregressive and a first order moving average model or ARMA(2,1). The ARMA order can also be increased, so the general form of an ARMA(n,n−1) model becomes $$X_t = \phi_1 \cdot X_{t-1} + \phi_2 \cdot X_{t-2} + \ldots + \phi_n \cdot X_{t-n} + a_t - \theta_1 \cdot a_{t-1} - \theta_2 \cdot a_{t-2} - \ldots - \theta_{n-1} \cdot a_{t-n+1} \qquad (1.6)$$

Model Parameters

The autoregressive model parameters ($\theta_1$, $\theta_2$, etc.) are obtained by using least squares estimates minimizing the sum of squares of $a_t$'s. For the AR(1) example the parameter estimate becomes $$\hat{\phi}_1 = \frac{\sum_{t=2}^{N} X_t \cdot X_{t-1}}{\sum_{t=2}^{N} X_{t-1}^2} \qquad (1.7)$$

where,
N=number of data points
For higher order AR models, an ordinary regression formula can be used for parameter estimation $$\hat{\beta} = (X' \cdot X)^{-1} \cdot X' \cdot Y \qquad (1.8)$$

For the general AR(n) model, the parameter estimation becomes $$\hat{\underline{\phi}} = (\underline{X}' \cdot \underline{X})^{-1} \cdot \underline{X}' \cdot \underline{Y} \qquad (1.9)$$

where, $$\hat{\underline{\phi}} = \begin{bmatrix} \hat{\phi}_1 \\ \hat{\phi}_2 \\ \vdots \\ \hat{\phi}_n \end{bmatrix}$$

$$\underline{X} = \begin{bmatrix} X_n & X_{n-1} & \ldots & X_1 \\ X_{n+1} & X_n & \ldots & X_2 \\ \vdots & \vdots & & \vdots \\ X_{N-1} & X_{N-2} & \ldots & X_{N-n} \end{bmatrix}$$

$$\underline{Y} = \begin{bmatrix} X_{n+1} \\ X_{n+2} \\ \vdots \\ X_N \end{bmatrix}$$

Estimating the moving average model parameters ($\theta_1$, $\theta_2$, etc.) requires nonlinear least squares. This can be seen from an ARMA(2,1) example, where all of the observations up to t−1 are known. The ARMA(2,1) model $$X_t = \phi_1 \cdot X_{t-1} + \phi_2 \cdot X_{t-2} + a_t - \theta_1 \cdot a_{t-1} \qquad (1.5)$$

To solve for $X_t$ the value of $a_{t-1}$ must be known, so an expression for $a_{t-1}$ is obtained.

$$a_{t-1} = X_{t-1} - \phi_1 \cdot X_{t-2} - \phi_2 \cdot X_{t-3} + \theta_1 \cdot a_{t-2} \qquad (1.10)$$

Substituting equation 1.10 into the ARMA model results in:

$$X_t = (\phi_1 - \theta_1) X_{t-1} + (\phi_2 + \theta_1 \cdot \phi_1) X_{t-2} + \theta_1 \cdot \phi_2 \cdot X_{t-3} - \theta_1^2 \cdot a_{t-2} + a_t \qquad (1.11)$$

This is repeated for $a_{t-2}$ and then $a_{t-3}$, and so on. It can be seen that Eq. 1.11 is nonlinear, because the products and squares of $\phi_1$, $\phi_2$, and $\theta_1$ are present. The nonlinear least squares method is used for parameter estimation to reduce to an iterative least square. The recursive process required for the ARMA parameter estimation is much longer, computationally and computer/processor resource intensive, than the AR parameter estimation.

Modeling Procedure

The DDS modeling procedure starts by fitting an AR(1) model. If this model isn't adequate, it can be concluded that the $a_t$'s are not independent and that they depend on $X_{t-2}$, $a_{t-1}$ and $a_t$. This leads to an ARMA(2,1) model (a higher order model) as derived above. If the ARMA(2,1) proves to be inadequate, again the at's can modeled to be dependent on $X_{t-3}$, $a_{t-2}$, $a_{t-1}$ and $a_t$.

$$a_t' = \phi_3 \cdot X_{t-3} - \theta_1 \cdot a_{t-1} - \theta_2 \cdot a_{t-2} + a_t \qquad (1.12)$$

Substituting back into the inadequate ARMA(2,1) model:

$$X_t = \phi_1 \cdot X_{t-1} + \phi_2 \cdot X_{t-2} + \phi_3 \cdot X_{t-3} + a_t - \theta_1 \cdot a_{t-1} - \theta_2 \cdot a_{t-2} \qquad (1.13)$$

The model is now an ARMA(3,2) model. If this proves to be inadequate the procedure can be repeated and a ARMA(4,3) created. This process shows how the ARMA(n,n−1) model is arrived at. Using an ARMA(n,n−1) model ensures that the dependence of $a_t$ has been removed. The ARMA(n,n−1) model is:

$$X_t = \phi_1 \cdot X_{t-1} + \phi_2 \cdot X_{t-2} + \ldots + \phi_n \cdot X_{t-n} + a_t - \theta_1 \cdot a_{t-1} - \theta_2 \cdot a_{t-2} - \ldots - \theta_{n-1} \cdot a_{t-n+1} \qquad (1.6)$$

Figure 2A:
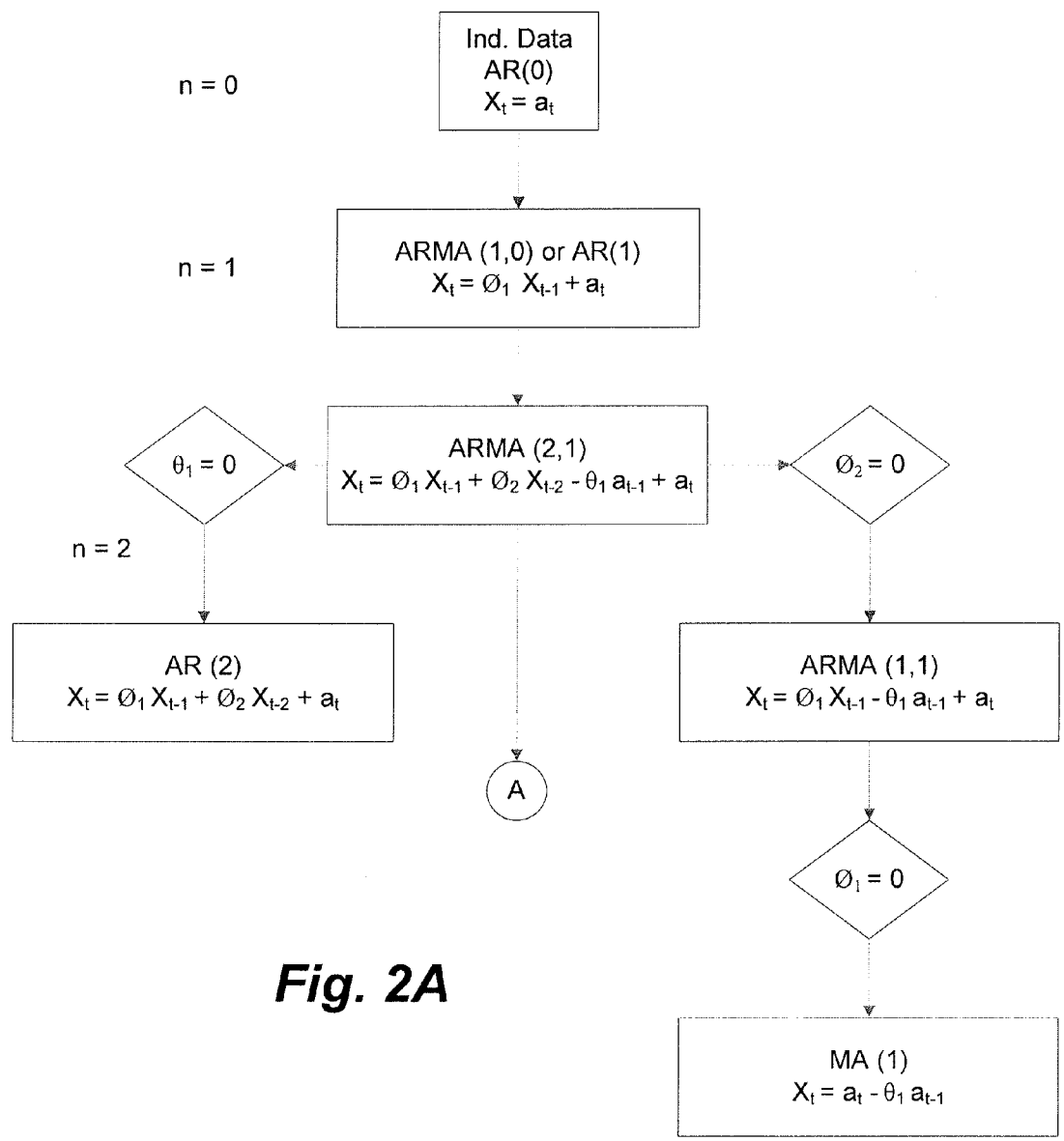
FIGS. 2A-2C are a diagram of a DDS modeling procedure.
Figure 2B:
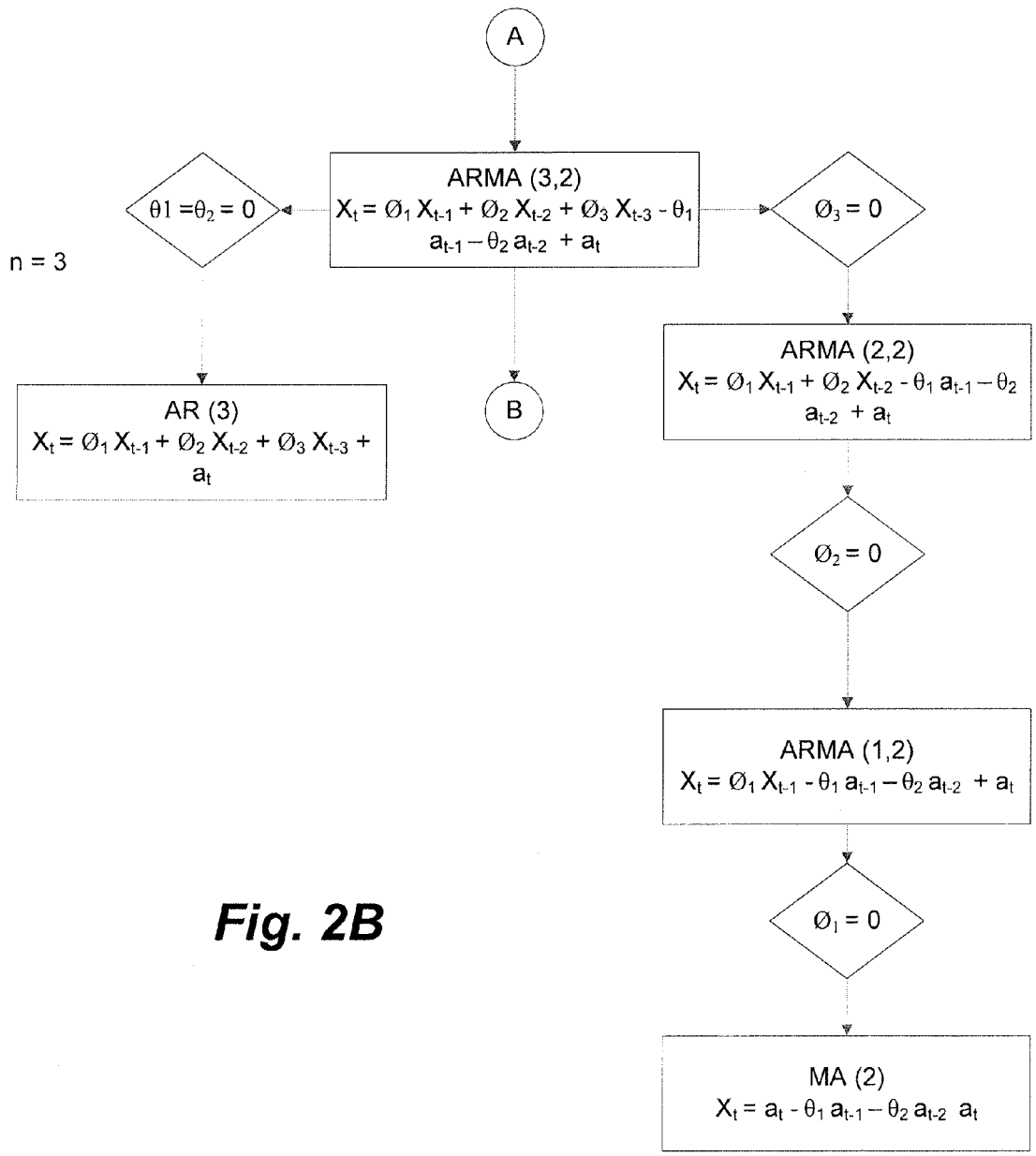
Figure 2C:
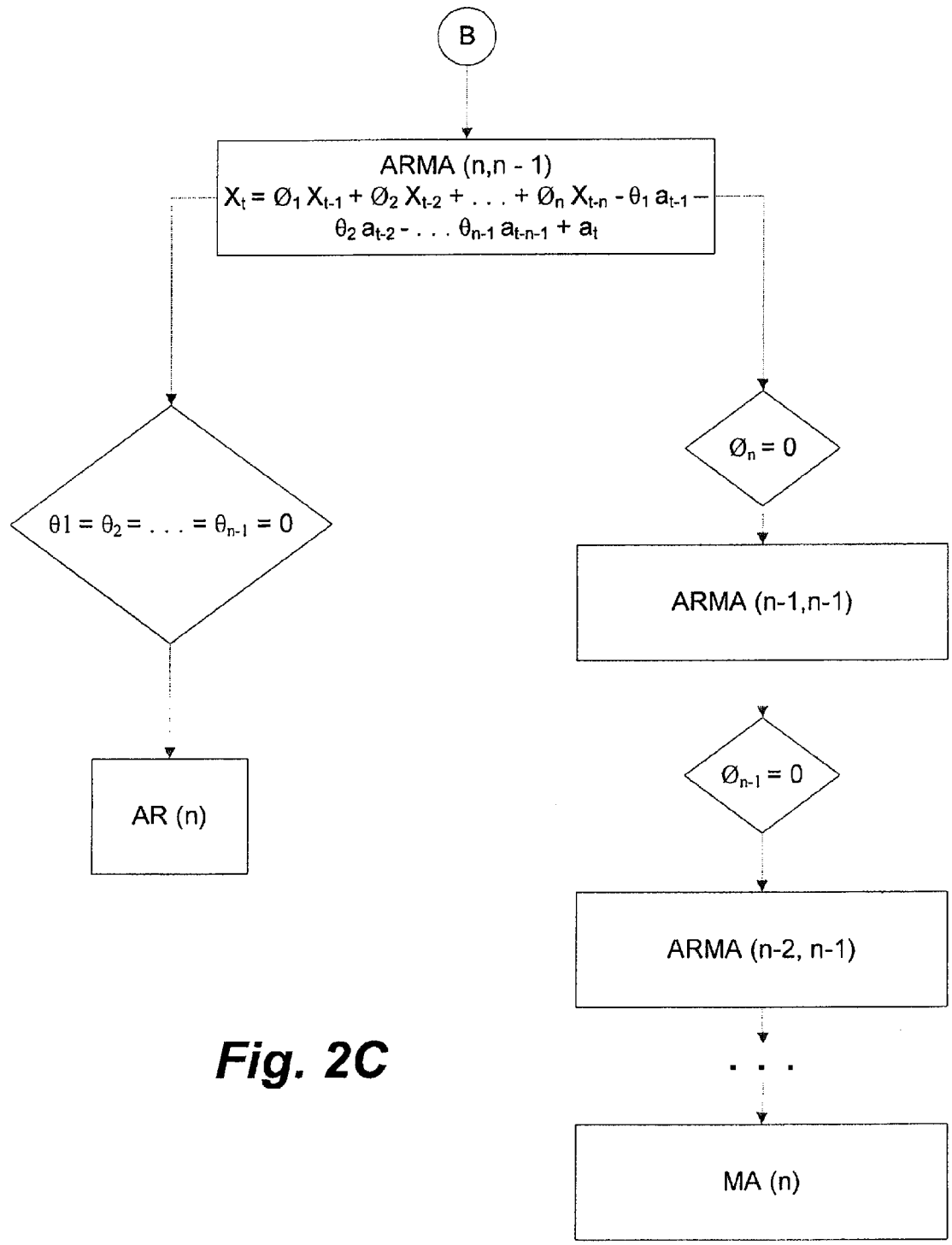

FIGS. 2A-2C illustrates the DDS modeling procedure. Once an adequate ARMA model is found, the actual parameters can be examined for further model reduction. If one of the parameters (e.g., an autoregressive parameter or a moving average parameter) contains zero within its confidence interval, that parameter can be assumed to be zero and removed. For example, FIG. 2B shows that if $\theta_1$ and $\theta_2$ contain zero within their confidence interval the ARMA(3,2) model can be reduced to an AR(3) model. This type of reduction is very useful, because the moving average parameters require recursive calculation, while the autoregressive parameters can be calculated directly. Thus, for each level of the ARMA model, reduction to a lower level, or to an AR or MA model is attempted.

Model Adequacy

A model order is deemed adequate if a significant reduction in the residual sum of squares (RSS) is no longer seen with higher order models.

$$RSS = \sum_{t=n+1}^{N} a_t^2 \qquad (1.14)$$

Two other tests for model adequacy are also employed, the F-Test and residual autocorrelations. The F-Test is a test used in linear regression. The F-Test tests if some of the model parameters are restricted to zero, and is used as a comparison between two models.

$$F = \frac{A_1 - A_0}{s} \div \frac{A_0}{N-r} \sim F(s, N-r) \quad (1.15)$$

where,
$A_1$=sum of squares of the unrestricted model,
$A_1$=sum of squares of the restricted model, and
$F(s,N-r)$=F-distribution with s and N−r degrees of freedom.

If the value of F obtained from the equation is greater than a predetermined threshold (e.g. the value for a 5% significance value obtained from an F-distribution table), then the higher model is significant. If the value is lower, then the smaller order model is significant.

The residual autocorrelations is a rough check on the independence of the $a_t$'s. The following formula can be used to determine how small the autocorrelations should be.

$$\sigma(\hat{\rho}_k) \cong \frac{1}{\sqrt{N}} [1 + 2(\hat{\rho}_1^2 + \hat{\rho}_2^2 + \ldots + \hat{\rho}_p^2)]^{1/2}, k > p \quad (1.16)$$

where,
$\sigma(\hat{\rho}_k)$=standard error of estimated autocorrelations when $\rho_k$=0 for k>p The $\hat{\rho}_k$'s are asymptotically normally distributed, so they can be assumed to have a value of zero within 5% by verifying $$|\hat{\rho}_k| < 1.96 \cdot \sigma(\hat{\rho}_k) \quad (1.17)$$

Another way to test the independence of the $a_t$'s is to use the unified autocorrelations, $\hat{\rho}_k/\sigma(\hat{\rho}_k)$. When all of the unified autocorrelations are autocorrelations are within a predetermined band (e.g. ±1.96), the $a_t$'s can be assumed to be independent. The output of the DDS program uses the absolute value of the unified autocorrelations, and indicative of the quantity of unified autocorrelations that are greater than two.

Forecasting

The DDS models can be used to forecast or predict future values using conditional expectation. Take for example the AR(1) model at t−1, $X_{t-1}$ is a known value:

$$X_t = \phi_1 X_{t-1} + a_t \quad (1.1)$$

Since the $a_t$ is unknown the one step ahead forecast becomes:

$$\hat{X}_{t-1}(1) = \phi_1 \cdot X_{t-1} \quad (1.18)$$

The error for the forecast is then:

$$e_{t-1}(1) = X_t - \hat{X}_{t-1}(1) = a_t \quad (1.19)$$

This equation shows that the forecasting errors are also the $a_t$'s, so the least squares estimate of the model parameters that minimizes the sum of squares of $a_t$'s also minimizes the forecasting error. The conditional expectation forecasts can also be extended to higher order models. For the general AR(n) model:

$$\hat{X}_{t-1}(1) = \phi_1 \cdot X_{t-1} + \theta_2 \cdot X_{t-2} + \ldots + \phi_n \cdot X_{t-n} \quad (1.20)$$

The DDS models are capable of providing arbitrary lag forecasts, so the user can choose the step ahead in time for their specific application.

Modeling

Following the modeling procedure outlined above, the forecaster 115 finds the best fit models for yaw rate data. The models are then used to forecast future yaw rates. The future yaw rates are provided to the ESC 120 and used for stability control.

The forecasted yaw rates can also be used by other functions that need yaw rate information. The models are adjusted to provide yaw rate forecasts that are indicative of yaw rates expected at a certain time in the future to compensate for latencies in the system receiving the predicted yaw rates, improving the performance of the system using the yaw rate.

Various features and advantages of the invention are set forth in the following claims.

What is claimed is:

1. A yaw-rate forecasting system for a vehicle, the system comprising:
   a yaw rate sensor configured to detect a yaw rate of the vehicle and generate a signal indicative of the detected yaw rate;
   an electronic control unit coupled to the yaw rate sensor, the electronic control unit configured to receive the signal indicative of the yaw rate of the vehicle from the yaw rate sensor, generate a model of a future yaw rate using the detected yaw rates, verify an adequacy of the model, extend the model if the model is found to be inadequate, forecast a future yaw rate based on the model, or extended model if the model is found to be inadequate, determine a stability of the vehicle using the forecasted yaw rate, determine, an action to take based at least in part on the predicted yaw rate, and generate a signal to control actuation of a vehicle brake;
   wherein the model is determined to be adequate when a significant reduction in a residual sum of squares is no longer seen with a higher order model.

2. The system of claim 1, wherein the model takes the form $$X_t = \phi_1 \cdot X_{t-1} + \phi_2 \cdot X_{t-2} + \ldots + \phi_n \cdot X_{t-n} + a_t \quad (1.2)$$

where,
$X_t$=Data at time t,
ø=model parameter (constant),
$x_{t-1}$=Data at time t-1, and
$a_t$=sequence of uncorrelated variables.

3. The system of claim 1, wherein the model is a first order autoregressive model.

4. The system of claim 3, wherein the model is tested for adequacy and the model is increased one order of autoregression and one order of moving average when the model is not adequate.

5. The system of claim 4, wherein the testing for adequacy and the increasing the order of the autoregression and of the moving average is repeated until the model is found to be adequate.

6. The system of claim 5, wherein the parameters of the model found to be adequate are examined, and the model is reduced when one or more of the parameters is found to be zero.

7. The system of claim 6, wherein the order of the autoregression is reduced when an autoregression parameter is zero.

8. The system of claim 6, wherein the order of the moving average is reduced when a moving average parameter is zero.

9. The system of claim 6, wherein one or more autoregression parameters are obtained using least squares estimates.

10. The system of claim 6, wherein a higher order autoregression parameter is obtained using an ordinary regression formula.

11. The system of claim 6, wherein a moving average parameter is estimated using a nonlinear least squares.

12. The system of claim 1, wherein the model is determined to be adequate when at least one of an F-test returns a significance value below a predetermined threshold, and a unified autocorrelation is within a predetermined band.

13. A method of stabilizing a vehicle based on a predicted future yaw rate of a vehicle, the method comprising:
- detecting a plurality of yaw rates of the vehicle over a period of time by a yaw rate sensor;
- providing an indication of the detected yaw rates to a controller;
- the controller:
- generating a model of a future yaw rate using the detected yaw rates;
- verifying an adequacy of the model;
- extending the model if the model is found to be inadequate;
- determining a predicted yaw rate for a moment in the future based on the model, or the extended model if the model was found to be inadequate;
- providing the predicted yaw rate to an electronic stability control system; and
- determining, by the electronic stability control system, an action to take based at least in part on the predicted yaw rate, and generating a signal to control actuation of a vehicle brake;

wherein the model is determined to be adequate when a significant reduction in a residual sum of squares is no longer seen with a higher order model.

14. The method of claim 13, wherein the model is a first order autoregression, and further comprising testing the model for adequacy, increasing one order of autoregression and one order of moving average when the model is not adequate.

15. The method of claim 13, further comprising examining the parameters of a model verified as adequate, and reducing the model when one or more of the parameters is found to be zero.

16. The method of claim 13, further comprising determining the model is adequate when a significant reduction in a residual sum of squares is no longer seen with a higher order model.

17. The method of claim 13, further comprising determining the model is adequate when at least one of an F-test returns a significance value below a predetermined threshold, a residual autocorrelation of variables is below a predetermined threshold, and a unified autocorrelation is within a predetermined band.

* * * * *